(12) United States Patent
Wei et al.

(10) Patent No.: US 11,207,999 B2
(45) Date of Patent: Dec. 28, 2021

(54) CHARGER AND CHARGING METHOD FOR CHARGING THE BATTERY OF AN ELECTRIC MOTORCYCLE BY USING CHARGING STATIONS FOR CARS

(71) Applicant: Delta Electronics, Inc., Taoyuan (TW)

(72) Inventors: Chung-Hwa Wei, Taoyuan (TW); Cheng-Hsien Cho, Taoyuan (TW); Hui-Hsin Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 195 days.

(21) Appl. No.: 16/595,706

(22) Filed: Oct. 8, 2019

(65) Prior Publication Data

US 2021/0006082 A1 Jan. 7, 2021

(30) Foreign Application Priority Data

Jul. 2, 2019 (CN) .......................... 201910589181.9

(51) Int. Cl.
*B60L 53/60* (2019.01)
*B60L 53/30* (2019.01)
(Continued)

(52) U.S. Cl.
CPC .............. *B60L 53/60* (2019.02); *B60L 53/14* (2019.02); *B60L 53/16* (2019.02); *B60L 53/305* (2019.02);
(Continued)

(58) Field of Classification Search
CPC ........ H02J 7/00; H02J 7/0047; H02J 7/00032; H02J 7/00036; H02J 7/02; H02J 7/00045;
(Continued)

(56) References Cited

U.S. PATENT DOCUMENTS

2013/0020993 A1* 1/2013 Taddeo ................... B60L 53/16
320/109
2013/0229143 A1 9/2013 Chou et al.
(Continued)

FOREIGN PATENT DOCUMENTS

EP 3462564 A1 4/2019
JP 6222744 B2 * 11/2017
WO WO-2012164644 A1 12/2012

OTHER PUBLICATIONS

European Search Report dated Jul. 3, 2020 in EP Application No. 20157373.0, 12 pages.
(Continued)

*Primary Examiner* — Richard Isla
*Assistant Examiner* — Manuel Hernandez
(74) *Attorney, Agent, or Firm* — Muncy, Geissler, Olds and Lowe, P.C.

(57) ABSTRACT

A charger includes a first connection port, a second connection port, a DC-DC converter, a first microcontroller, and a second microcontroller. The DC-DC converter is configured to convert a first DC voltage into a second DC current/voltage according to a regulation signal, and output the second DC current/voltage through the second connection port. The second DC voltage is lower than the first DC voltage. The first microcontroller is configured to communicate with a DC charging station by handshake via the first connection port. When the handshake between the first microcontroller and the DC charging station succeeds, the first microcontroller generates a regulation indication according to a result of the handshake between the first microcontroller and a battery, the second microcontroller generates the regulation signal according to the regulation indication, and the first DC voltage is supplied by the DC charging station.

8 Claims, 5 Drawing Sheets

(51) Int. Cl.
*B60L 53/16* (2019.01)
*H01M 10/44* (2006.01)
*H02J 7/00* (2006.01)
*H02J 7/02* (2016.01)
*B60L 53/14* (2019.01)

(52) U.S. Cl.
CPC .............. *H01M 10/44* (2013.01); *H02J 7/00* (2013.01); *H02J 7/00032* (2020.01); *H02J 7/00036* (2020.01); *H02J 7/0047* (2013.01); *H02J 7/02* (2013.01); *B60L 2210/10* (2013.01); *B60L 2210/30* (2013.01); *H02J 7/00045* (2020.01); *H02J 2207/40* (2020.01)

(58) Field of Classification Search
CPC ...... H02J 2207/40; B60L 53/14; B60L 53/60; B60L 53/305; B60L 53/16; B60L 2210/10; B60L 2210/30; H01M 10/44

USPC .................................................. 320/107, 109
See application file for complete search history.

(56) References Cited

U.S. PATENT DOCUMENTS

| 2016/0036256 A1* | 2/2016 | Sukup ................... H02J 7/0042 |
| | | 320/107 |
| 2017/0005494 A1* | 1/2017 | Li ........................... G06F 1/263 |
| 2017/0201101 A1* | 7/2017 | Yang ...................... H02M 3/1584 |
| 2018/0269693 A1* | 9/2018 | Plag ...................... H02J 7/00036 |
| 2020/0161872 A1* | 5/2020 | Files ...................... H02J 50/10 |

OTHER PUBLICATIONS

Office Action dated Jun. 1, 2021 in JP Application No. 2020-083044, 4 pags.

* cited by examiner

CHARGER AND CHARGING METHOD FOR CHARGING THE BATTERY OF AN ELECTRIC MOTORCYCLE BY USING CHARGING STATIONS FOR CARS

CROSS REFERENCE TO RELATED APPLICATIONS

This Application claims priority of China Patent Application No. 201910589181.9, filed on Jul. 2, 2019, the entirety of which is incorporated by reference herein.

BACKGROUND OF THE INVENTION

Field of the Invention

The present invention relates to a charging technology, and more particularly to a charger and a charging method that can charge the battery of an electric motorcycle by using charging stations for cars that have been installed in various locations.

Description of the Related Art

With the rising awareness of the need to reduce air pollution, conserve energy and reduce carbon dioxide emissions, the importance of developing and utilizing green energy has gradually gained the attention of the public and become a key project for countries to actively invest in and develop. As a result, in recent years, electric vehicles that use built-in batteries as driving sources have become more and more popular because they do not emit exhaust gases, which results in a yearly increase in the use of electric vehicles.

Power can be restored to the battery of an electric vehicle by using a charging station to charge the battery directly or by replacing the battery with a new one. Electric vehicles commonly include electric cars and electric motorcycles. Moreover, depending on differences in specifications and charging voltage, dedicated charging plugs may be designed specifically to fit different kinds of electric vehicles, and charging stations can be further subdivided into charging stations for cars and charging stations for motorcycles.

In general, the configuration ratio of charging stations for motorcycles is usually pretty low in countries where electric cars are more popular, and it is really a pity that electric motorcycles cannot be charged at charging stations designed for cars whose configuration ratio is higher.

BRIEF SUMMARY OF THE INVENTION

In an embodiment, a charger comprises a first connection port, a second connection port, a DC-DC converter, a first microcontroller and a second microcontroller. The first connection port is configured to connect a DC charging station. The second connection port is configured to connect a battery. The DC-DC converter is coupled between the first connection port and a second connection port. The DC-DC converter is configured to convert a first DC voltage into a second DC current/voltage according to a regulation signal, and to output the second DC current/voltage through the second connection port. The second DC voltage is lower than the first DC voltage. The first microcontroller is configured to communicate with the DC charging station by handshake via the first connection port, and the first microcontroller is also configured to communicate with the battery by handshake via the second connection port. When the handshake between the first microcontroller and the DC charging station succeeds, the first microcontroller generates a regulation indication according to a handshake result between the first microcontroller and the battery, and the first DC voltage is supplied by the DC charging station. The second microcontroller is configured to generate the regulation signal according to the regulation indication.

In an embodiment, a charging method adapted to a charger comprises: using a first microcontroller of the charger to communicate with a DC charging station by handshake via a first connection port of the charger; using the first microcontroller of the charger to communicate with a battery by handshake via a second connection port of the charger; when the handshake between the first microcontroller and the DC charging station succeeds, using the first microcontroller to generate a regulation indication according to a handshake result between the first microcontroller and the battery; using a second microcontroller of the charger to generate a regulation signal according to the regulation indication; and using a DC-DC converter of the charger to convert a first DC voltage into a second DC current/voltage according to the regulation signal, and output the second DC current/voltage through a second connection port of the charger so as to charge the battery, wherein the first DC voltage is supplied by the DC charging station when the handshake between the first microcontroller and the DC charging station succeeds, and the second DC voltage is lower than the first DC voltage.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In order to make the above objects, features and advantages of the embodiments of the present invention easier to understand, a detailed description is given in the following embodiments with reference to the accompanying drawings.

It should be understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second" "third", etc., to modify an element does not by itself connote any priority or precedence, but are used merely as labels to distinguish the elements that have the same name.

Figure 1:
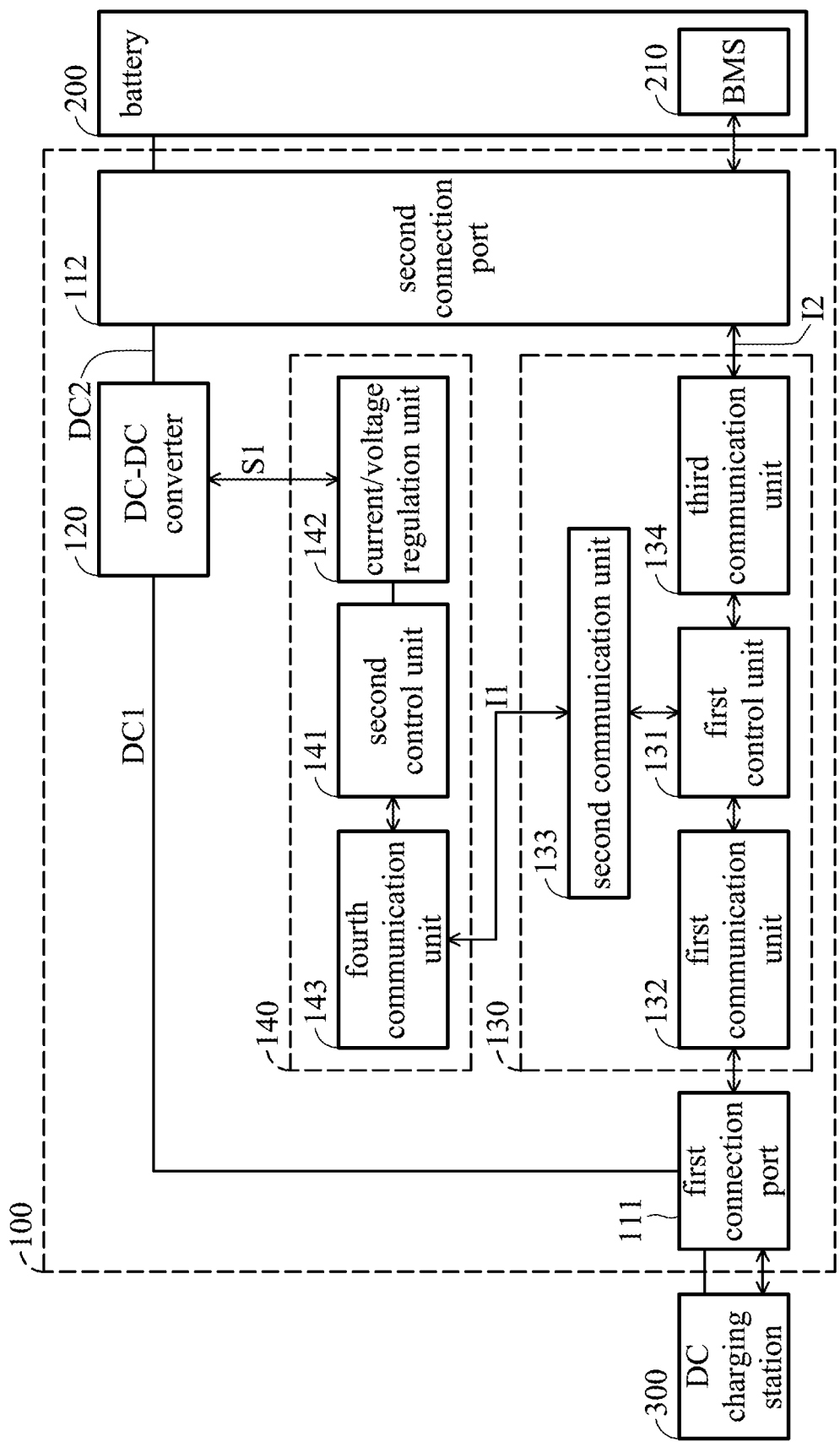
FIG. 1 is a block diagram illustrating a charging system according to a first embodiment of charger.

FIG. 1 is a block diagram illustrating a charging system according to a first embodiment of charger. Please refer to FIG. 1, charger 100 can be used as a charging bridge between a battery 200 and a DC (direct current) charging station 300. Herein, the battery 200 is a secondary battery that is rechargeable, and it refers in particular to a secondary battery that can be mounted on an electric motorcycle to serve as a driving source. Furthermore, the DC charging station refers specifically to a DC charging station for charging electric cars.

In some embodiments, the battery 200 can be provided with a battery management system (BMS) 210. Herein, the battery management system 210 can generally be used to monitor the charge state of the battery 200 and to manage the operating state of the battery 200. However, the present invention is not limited thereto. In other embodiments, the battery 200 may not be provided with the battery management system 210.

In some implementations, the battery 200 can be a Lithium-ion battery, a Nickel-Hydrogen battery, a Lead-acid battery, a Lead-crystal battery, a Zinc-air battery or any other suitable battery.

The charger 100 can include at least two connection ports (hereinafter referred to as first connection port 111 and second connection port 112, respectively), a DC-DC converter 120 and at least two microcontrollers (hereinafter referred to as first microcontroller 130 and second microcontroller 140, respectively). The DC-DC converter is coupled to the first connection port 111, the second connection port 112 and the second microcontroller 140, and the first microcontroller 130 is coupled to the first connection port 111, the second connection port 112 and the second microcontroller 140.

The first connection port 111 is configured to connect the DC charging station 300. In some embodiments, the DC charging station 300 includes a charging gun, and the charging connection port of the charging gun and the first connection port 111 of the charger 100 are compatible with each other, so the charger 100 may connect to the DC charging station 300. In other words, the charging connection port of the charging gun and the first connection port 111 of the charger 100 can respectively be the connectors match to a communication interface which is adopted by a certain charging standard. For example, the charging connection port of the charging gun and the first connection port 111 of the charger 100 may respectively be a male connector and a female connector that are match to the Controller Area Network (CAN) communication interface adopted by the CHAdeMO charging standard. However, the present invention is not limited thereto. The charging standard can be SAE, IEC CCS, etc., or any other suitable charging standard.

The second connection port 112 is configured to connect the battery 200. Herein, the second connection port 112 can be connected to the battery 200 through a dedicated connection line. In some embodiments, a communication interface adopted by the second connection port 112 may be a Controller Area Network (CAN) communication interface, an Inter-Integrated Circuit (I²C) communication interface, a Universal Asynchronous Receiver/Transmitter (UART) communication interface, a System Management Bus (SM-Bus) communication interface, or any other suitable communication interface. However, the present invention is not limited thereto. In other embodiments, the second connection port 112 can be a general connection terminal without a communication interface. For example, when the battery 200 does not have a battery management system 210, the second connection port can be provided without a communication interface.

The DC-DC converter 120 has an input terminal and an output terminal. The DC-DC converter can convert a first DC voltage DC1 received through its input terminal into a second DC current/voltage DC2 according to a regulation signal S1, then output the second DC current/voltage DC2 through its output terminal. Herein, since the first DC voltage DC1 output by the DC charging station 300 was originally suitable for charging electric cars, the first DC voltage DC1 is usually much higher than the second DC voltage DC2 required to charge the battery 200. Therefore, the DC-DC converter 120 is typically used as a step-down DC/DC converter to convert a first DC voltage DC1 whose voltage is higher into a second DC current/voltage whose voltage is lower. The magnitude of the current value or the voltage value of the second DC current/voltage DC2 converted by the DC-DC converter 120 can be determined based on the regulation signal S1.

In some implementations, the voltage value of first DC voltage DC1 may substantially be within a range of 200 volts (V) to 500 volts, and the voltage value of second DC voltage DC2 may substantially be 50 volts. However, the present invention is not limited thereto. The voltage value of the first DC voltage DC1 can be determined based on the voltage value that can be output by the DC charging station 300. The voltage value of the second DC voltage DC2 can be determined based on the charging voltage required for the battery 200.

The first microcontroller 130 is mainly configured to handle operations such as communications, management and instructions release. Herein, the first microcontroller 130 is connected between the first connection port 111 and the second connection port 112, so a communication channel does not directly form between the first connection port 111 and the second connection port 112. In this way, the DC charging station 300 connected to the first connection port 111 cannot view information about the battery 200, and the DC charging station 300 may assume that its power is being supplied to an electric car, from beginning to end. Similarly, the battery 200 connected to the second connection port 112 cannot view information about the DC charging station 300, so the battery 200 will not find out that it is actually being charged by a charging station for electric cars. Therefore, after the first microcontroller 130 is set to block communication between the battery 200 and the DC charging station 300, potential problems that could occur between the battery 200 and the DC charging station 300 due to different communication standards can be avoided (e.g., the communication speeds of both do not match, the communication standards of both do not match, etc.), and it allows the battery 200 to be charged at a DC charging station for electric cars.

In an embodiment, the first microcontroller 130 may include a first control unit 131 and at least two communication units (hereinafter referred to as the first communication unit 132 and the second communication unit 133, respectively). The first control unit 131 is coupled between the first communication unit 132 and the second communication unit 133. The first communication unit 132 is coupled to the first connection port 111. Moreover, the second communication unit 133 is coupled to the second microcontroller 140. Herein, the first control unit 131 can communicate with the DC charging station 300 through the first connection port 111 by using the first communication unit 132, and it can communicate with the second microcontroller 140 by using the second communication unit 133.

In another embodiment, the first microcontroller 130 may further include a third communication unit 134, and the third communication unit 134 is coupled to the first control unit 131 and the second connection port 112. At this time, the first microcontroller 130 can further communicate with the battery 200 which is provided with the battery management system 210 via the second connection port 112. In some embodiments, the communication standard adopted by the first communication unit 132 can correspond to the communication interface adopted by the first connection port 111. The communication standard adopted by the second communication unit 133 can correspond to the communication standard adopted by the second microcontroller 140, for example, a Universal Asynchronous Receiver/Transmitter communication standard, a Serial Peripheral Interface (SPI) communication standard, a Controller Area Network communication interface, an Inter-Integrated Circuit communication interface, a Universal Asynchronous Receiver/Transmitter communication interface, a System Management Bus communication interface, or any other suitable communication interface or communication standard. But the present invention is not limited thereto.

Furthermore, the communication standard adopted by the third communication unit 134 can correspond to the communication interface adopted by the second connection port 112.

The second microcontroller 140 is mainly configured to perform corresponding regulation on the DC-DC converter 120 according to the indication issued by the first microcontroller 130. In an embodiment, the second microcontroller 140 may include a second control unit 141, a current/voltage regulation unit 142 and a fourth communication unit 143. The second control unit 141 is coupled to the current/voltage regulation unit 142 and the fourth communication unit 143. The current/voltage regulation unit 142 is coupled to the DC-DC converter 120. Moreover, the fourth communication unit 143 is coupled to the second communication unit 133 of the first microcontroller 130. Herein, the second control unit 141 can communicate with the first microcontroller 130 by using the fourth communication unit 143, and regulate the DC-DC converter 120 by using the current/voltage regulation unit 142.

In this disclosure, thanks to the configuration of two microcontrollers (i.e., first microcontroller 130 and second microcontroller 140), the charger 100 allows the actions of the communications (i.e., communications with the DC charging station 300 and/or communications with the battery 200) and the step down operation (i.e., regulation on the DC-DC converter 120) to be processed separately by individual microcontrollers, thereby reducing the workload of each microcontroller and increasing work efficiency. Furthermore, communication will be more concise and clean, and confusion may be avoided by isolating the different functions of the communications.

Figure 2:
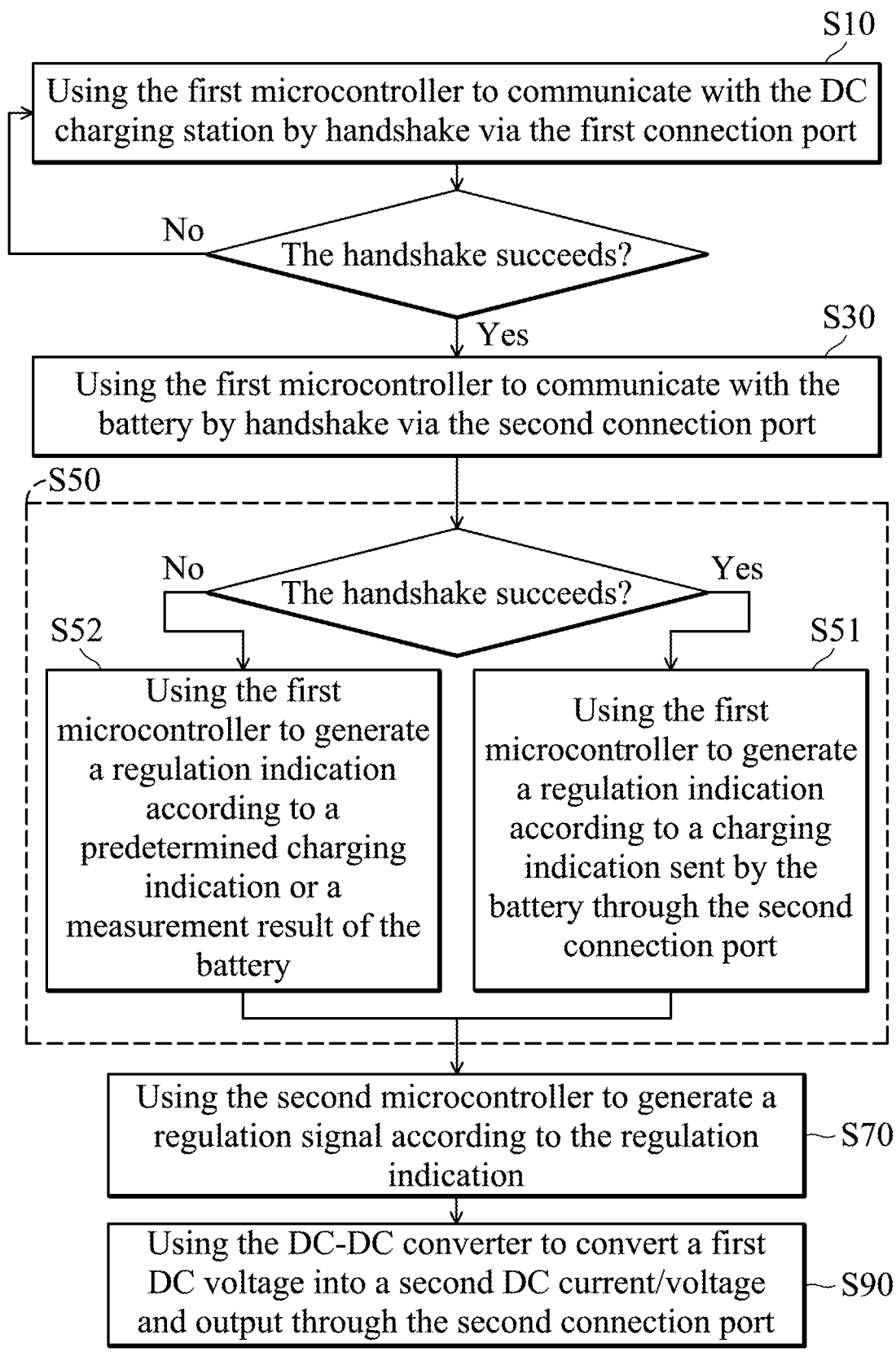
FIG. 2 is a flowchart of a first embodiment of charging method.

FIG. 2 is a flowchart of a first embodiment of charging method. Please refer to FIG. 1 and FIG. 2, the charger 100 can charge the battery 200 according to the first embodiment of the charging method.

In the first embodiment of the charging method, the charger 100 can use the first microcontroller 130 to communicate with the DC charging station 300 by handshake via the first connection port 111 (step S10), and use the first microcontroller 130 to communicate with the battery 200 by handshake via the second connection port 112 (step S30). Herein, the charger 100 can first perform step S10, and determine whether to continue step S30 according to a handshake result in step S10, as shown in FIG. 2. However, the present invention is not limited thereto. The charger 100 can also first perform step S30, and then perform step S10. Furthermore, in other embodiments, the charger 100 can further perform step S10 and step S30 in synchronization.

Hereinafter, the description will be explained by an example that first executes step S10 and determines whether to continue step S30 based on the handshake result in step S10.

In an embodiment of step 10, the first microcontroller 130 may periodically transmit a handshake request signal to the first connection port 111 to attempt to perform a handshake, and it may determine whether the handshake has succeeded or not by confirming whether a handshake response signal has been received through the first connection port 111. However, the present invention is not limited thereto. In another embodiment, the first microcontroller 130 may wait to receive a handshake request signal transmitted by the DC charging station 300 via the first connection port 111, and then try to initiate a handshake with the DC charging station 300 by returning a handshake response signal.

Herein, when the handshake between the first microcontroller 130 and the DC charging station 300 fails, the charger 100 returns to step S10 or can enter into a sleep mode to wait for wake-up. When the handshake between the first microcontroller 130 and the DC charging station 300 succeeds, the charger 100 continues to perform step S30.

In an embodiment of step S30, the first microcontroller 130 can transmit a handshake request signal to the battery 200 to attempt to perform handshake, and obtain a handshake result between the first microcontroller 130 and the battery 200 by confirming whether a handshake response signal is received through the second connection port 112. When the first microcontroller 130 can receive the handshake response signal through the second connection port 112, the handshake result shows that the handshake between the first microcontroller 130 and the battery 200 is a success. Conversely, when the first microcontroller 130 does not receive a handshake response signal through the second connection port 112, the handshake result shows that the handshake between the first microcontroller 130 and the battery 200 has failed.

Herein, only after the handshake between the first microcontroller 130 and the DC charging station 300 succeeds and the first microcontroller 130 conducts a handshake with the battery 200, the DC charging station 300 will permit the output of the first DC voltage DC1 to the first connection port 111 of the charger 100.

When the handshake between the first microcontroller 130 and the DC charging station 300 succeeds and the first microcontroller 130 conducts a handshake with the battery 200, the charger 100 can utilize the first microcontroller 130 to generate a regulation indication I1 for use by the second microcontroller 140 according to the handshake result between the first microcontroller 130 and the battery 200 (step S50), so that the second microcontroller 140 can generate a regulation signal S1 to the DC-DC converter 120 according to the regulation indication I1 (step S70). After that, the charger 100 can utilize the DC-DC converter 120 to convert the first DC voltage DC1 input through the first connection port 111 to the second DC current/voltage DC2 according to the regulation signal S1, and output the second DC current/voltage DC2 to the battery 200 connected to the second connection port 112 (step S90), so as to charge the battery 200. The second DC voltage DC2 is lower than the first DC voltage DC1.

In an embodiment of step S50, when the handshake result between the first microcontroller 130 and the battery 200 shows that the handshake was successful, it means that the battery 200 has a battery management system 210. This time, the first microcontroller 130 can be controlled by the battery management system 210 of the battery 200, and generate the regulation indication I1 according to a charging indication I2 transmitted by the battery management system 210 through the second connection port 112 (step S51). The content of the charging indication I2 may include the values of a charging current and a charging voltage required by the battery 200. However, when the handshake result between the first microcontroller 130 and the battery 200 shows that the handshake has failed, this means that the battery 200 does not have a battery management system 211). This time, the first microcontroller 130 can choose to generate the regulation indication I1 according to a predetermined charging indication which has been pre-written in the first microcontroller 130. Alternatively, the first microcontroller 130 can obtain a measurement of the battery 200 by measuring via the second connection port 112, and then generate the regulation indication I1 according to the obtained measurement result (step S52).

In an embodiment of step S70, the second microcontroller 140 can utilize the current/voltage regulation unit 142 to generate the regulation signal S1. Herein, the regulation signal S1 may be a pulse signal or a frequency modulation signal.

Figure 3:
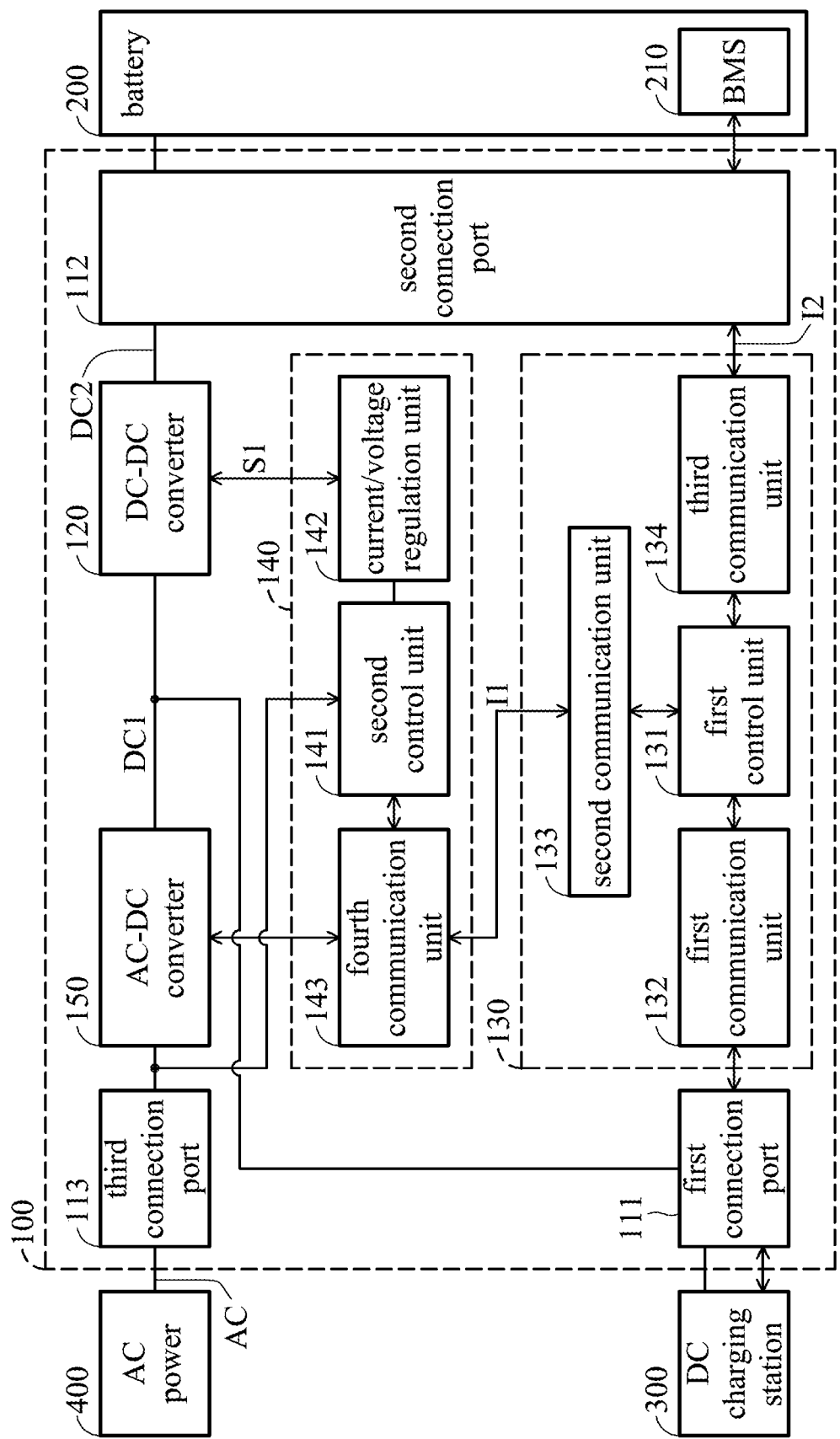
FIG. 3 is a block diagram illustrating a charging system according to a second embodiment of charger.

FIG. 3 is a block diagram illustrating a charging system according to a second embodiment of charger. Please refer to FIG. 3, in addition to being a charging bridge between the DC charging station 300 and battery 200, the charger 100 can also be a charging bridge between an AC (Alternating Current) power source 400 and battery 200.

In a second embodiment, the charger 100 can further include a third connection port 113 and an AC-DC converter 150. The third connection port 113 is coupled to the AC-DC converter 150 and the second microcontroller 140, and the AC-DC converter 150 is coupled to the input terminal of the DC-DC converter and the second microcontroller 140.

The third connection port 113 is configured to connect the AC power source 400. In some embodiments, the AC power source 400 can be utility power. The third connection port 113 can be a corresponding utility power plug, and the charger 100 can be connected to the AC power source 400 by plugging the third connection port 113 into the utility power socket.

The AC-DC converter 150 has an input terminal and an output terminal. The AC-DC converter 150 can convert an AC power AC received at its input terminal to a first DC voltage DC1, and then output the first DC voltage DC1 through its output terminal to the input terminal of the DC-DC converter 120 of the subsequent stage.

In the second embodiment, the second microcontroller 140 can further be configured to detect whether there is an AC power AC input through the third connection port 113, and report a detection result to the first microcontroller 130. In some embodiments, the second microcontroller 140 may detect by using a zero crossing point detection method.

Figure 4A:
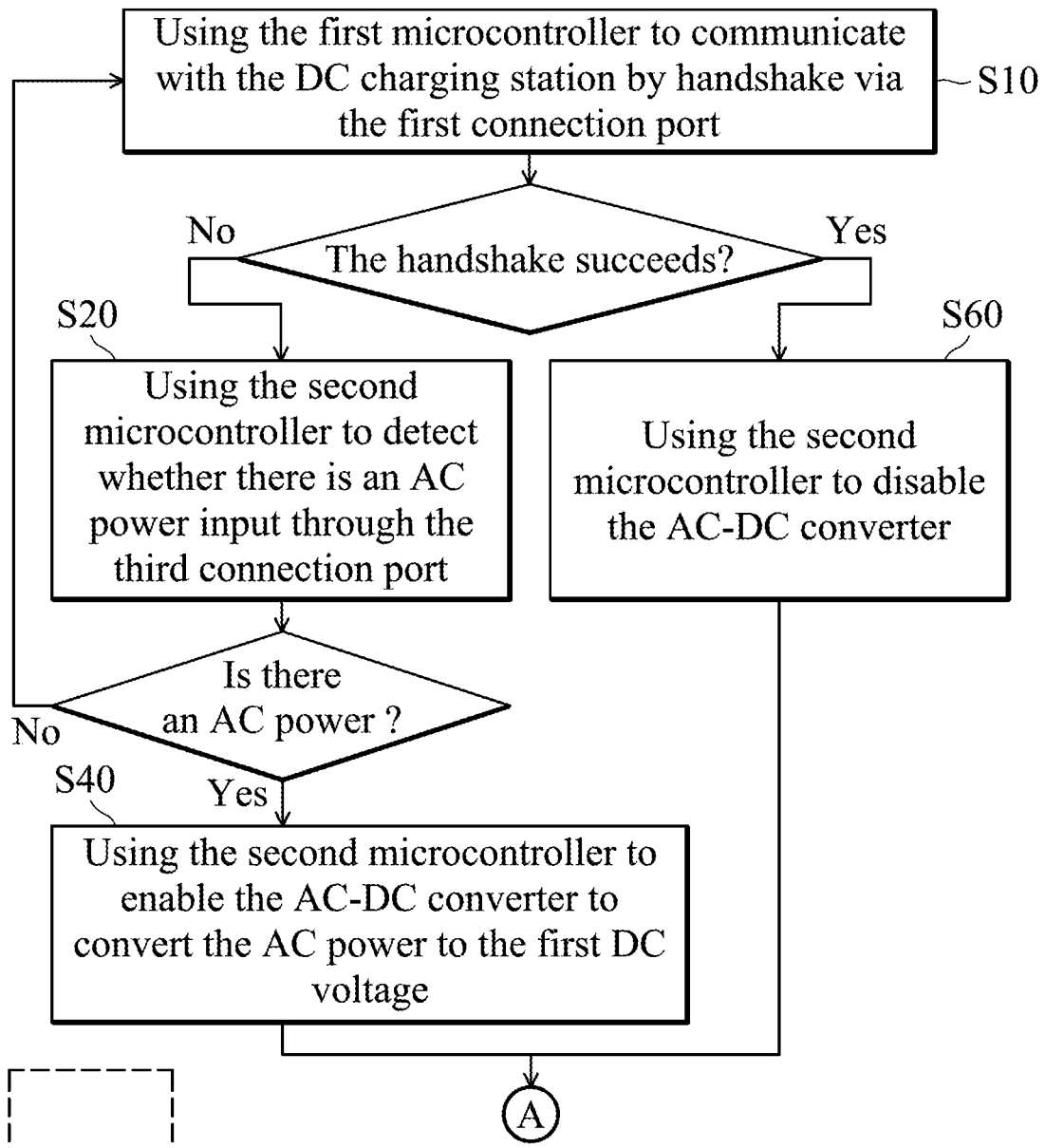
FIG. 4A and FIG. 4B are flowchart of a second embodiment of charging method.
Figure 4B:
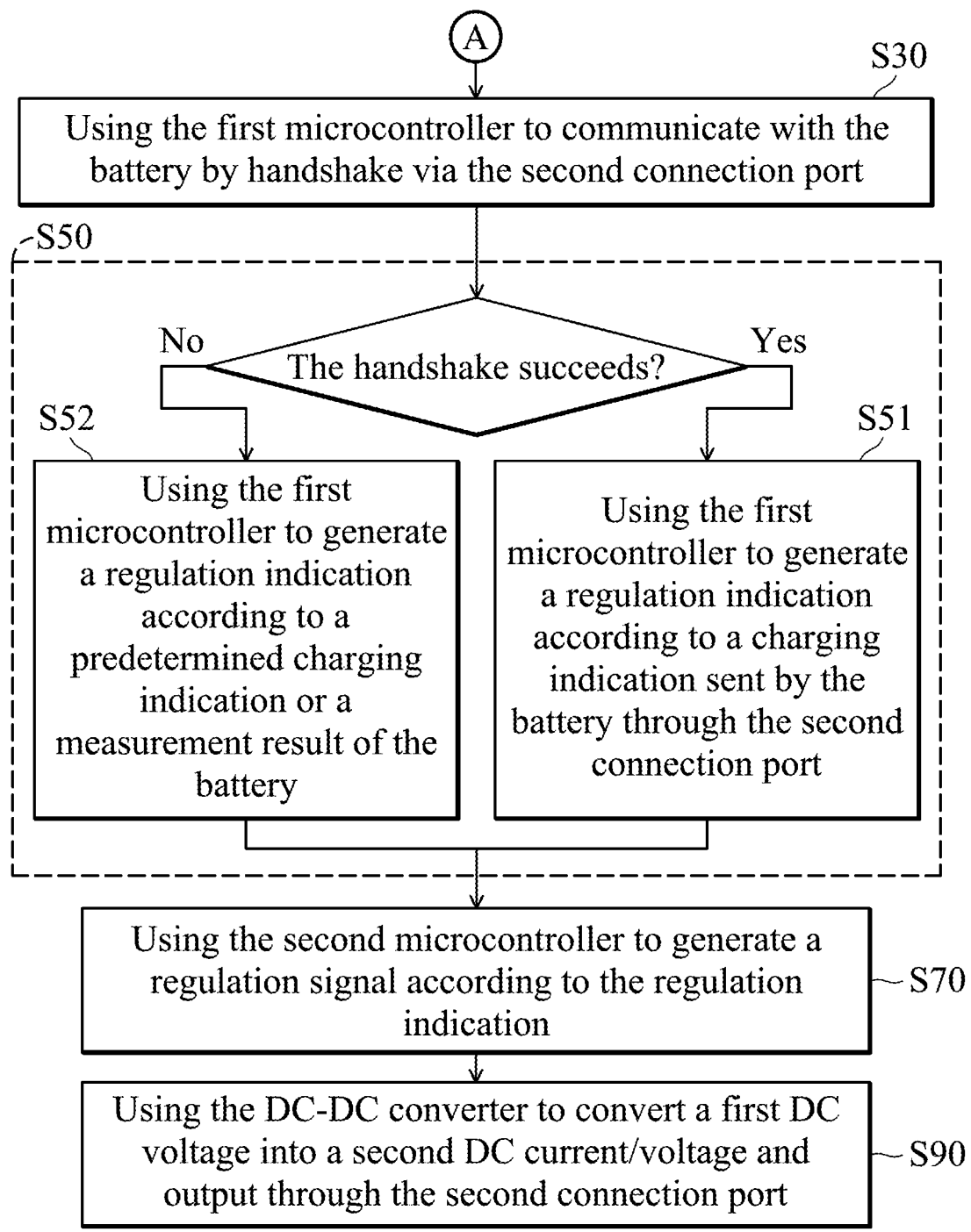

FIG. 4A and FIG. 4B are flowchart of a second embodiment of charging method. Please refer to all the figures from FIG. to FIG. 4B, the charger 100 can charge the battery 200 according to a second embodiment of charging method.

In the second embodiment of charging method, the charger 100 can utilize the first microcontroller 130 to communicate with the DC charging station 300 by handshake via the first connection port 111 (step S10), and utilize the second microcontroller 140 to detect whether there is an AC power AC input through the third connection port 113 (step S20).

In an implementation, the execution sequence of step S10 and step S20 may be swapped, or may be executed synchronously, and the second microcontroller 140 would report a detection result to the first microcontroller 130, such that the first microcontroller 130 can determine how to perform the subsequent charging steps according to the handshake result between the first microcontroller 130 and the DC charging station 300 and the detection result of the second microcontroller 140. In other words, both step S10 and step S20 should be performed at this time, and the first microcontroller 130 needs to wait for two results (i.e., the handshake result and the detection result) to determine out the subsequent step.

However, the present invention is not limited thereto. In another implementation, as long as the first microcontroller 130 finds that the handshake with the DC charging station 300 has succeeded, the charger 100 utilizes the first microcontroller 130 to disable the AC-DC converter 150 through the second microcontroller 140 (step S60), regardless of whether it receives the detection result of the second microcontroller 140. In other words, as long as the result in step S10 is that the handshake was successful, step S20 can be skipped.

However, when the handshake result in step S10 is that the handshake fails, the charger 100 must perform step S20 to confirm whether there is an AC power AC input or not. Herein, when the second microcontroller 140 detects that the AC power AC is input through the third connection port 113, the charger 100 can enable the AC-DC converter 150 by using the first microcontroller 130 through the second microcontroller 140, so as to convert the AC power AC to the first DC voltage DC1 (step S40).

When the second microcontroller 140 does not detect any AC power AC input through the third connection port 113, the charger 100 returns to perform step S10 (or perform step S10 and step S20), or can enter into a sleep mode to wait for wake-up.

Furthermore, the charger 100 can utilize the first microcontroller 130 to communicate with the battery 200 by handshake via the second connection port 112 (step S30). In the second embodiment, the charger 100 may first perform the handshake with the DC charging station 300 and/or detect the AC power AC (i.e., step S10, step S20, step S60 and step S40), and then perform the handshake with the battery 200 (i.e., step S30), as shown in FIG. 4A and FIG. 4B. However, the present invention is not limited thereto. The charger 100 may first perform the handshake with the battery 200, and then perform the handshake with the DC charging station 300 and/or detect the AC power AC. Moreover, in other embodiments, the charger 100 may perform both in synchronization.

When the handshake between the first microcontroller 130 and the DC charging station 300 succeeds, or when the handshake fails but the second microcontroller 140 detects AC power AC input through the third connection port 113, the first microcontroller 130 communicates with the battery 200 by handshake. After the first microcontroller 130 conducts a handshake with the battery 200, the charger 100 further utilizes the first microcontroller 130 to generate a regulation indication I1 for use by the second microcontroller 140 according to the handshake result between the first microcontroller 130 and the battery 200 (step 50), such that the second microcontroller 140 can generate a regulation signal S1 to the DC-DC converter 120 according to the regulation indication I1 (step 70). After that, the charger 100 can utilize the DC-DC converter 120 to convert the first DC voltage DC1 input through the first connection port 111 into a second DC current/voltage DC2, and output the second DC current/voltage DC2 through the second connection port 112 to the battery 200 which is connected to the second connection port 112 (step 90), so as to charge the battery 200.

When the handshake between the first microcontroller 130 and the DC charging station 300 succeeds, the first DC voltage DC1 received at the input terminal of the DC-DC converter 120 is supplied by the DC charging station 300 through the first connection port 111. When the handshake between the first microcontroller 130 and the DC charging station 300 fails but the second microcontroller 140 detects an AC power AC input through the third connection port 113, the first DC voltage DC1 received at the input terminal of the DC-DC converter 120 is supplied by the AC-DC converter 150.

Herein, step S30 in the second embodiment is substantially the same as step S30 in the first embodiment; step S50 in the second embodiment is substantially the same as step S50 in the first embodiment; and step S70 in the second embodiment is substantially the same as step S70 in the first embodiment. Therefore, the detailed descriptions of step S30, step S50 and step S70 are not repeated herein.

In some embodiments, the charger 100 may be integrated into an electric motorcycle as an on-board charger. However, the present invention is not limited thereto. In other embodiments, the charger 100 may be outside of the electric motorcycle as an off-board charger.

As described above, the embodiments of the present invention provide a charger and a charging method, which isolates the communication between the battery and the DC charging station by the configuration of the first microcontroller. Therefore, potential problems that may occur between the battery and the DC charging station due to different communication standard can be avoided, and enable the battery to be charged by the DC charging station which is typically set for charging electric cars. Furthermore, through the configuration of the two microcontrollers, the communications and the step-down operation during the charging process can be separately processed by individual microcontrollers, thereby reducing the workload of each microcontroller and increasing the work efficiency. Moreover, with the configuration of the third connection port and the AC-DC converter, the battery can also be charged by applying the AC power in addition to the DC charging station.

The features of the embodiments described above make persons having ordinary skill in the art can clearly appreciate the form of the present specification. Persons having ordinary skill in the art can appreciate that the objectives and/or the advantages of the above embodiments can be accomplished in consistent with the above embodiments by designing or modifying other processes and structures based on the content of the present disclosure. Persons having ordinary skill in the art can also appreciate that the equivalent constructions without departing from the scope and spirit of the present invention can be modified, substituted or retouched without departing from the scope and spirit of the present invention.

What is claimed is:

1. A charger, comprising:
    a first connection port, configured to connect a DC charging station;
    a second connection port, configured to connect a battery;
    a DC-DC converter, coupled between the first connection port and the second connection port, the DC-DC converter is configured to convert a first DC voltage into a second DC current/voltage according to a regulation signal and output the second DC current/voltage through the second connection port, wherein the second DC voltage is lower than the first DC voltage;
    a first microcontroller, configured to communicate with the DC charging station by handshake via the first connection port, and communicate with the battery by handshake via the second connection port, wherein when the handshake between the first microcontroller and the DC charging station succeeds, the first microcontroller generates a regulation indication according to a handshake result between the first microcontroller and the battery, and the first DC voltage is supplied by the DC charging station;
    a second microcontroller, configured to generate the regulation signal according to the regulation indication;
    a third connection port; and
    an AC-DC converter, coupled between the third connection port and the DC-DC converter, and configured to convert an AC power input through the third connection port;
    wherein the second microcontroller is further configured to detect whether there is the AC power input through the third connection port, and wherein when the handshake between the first microcontroller and the DC charging station fails and the second microcontroller detects that the AC power is input through the third connection port, the second microcontroller enables the AC-DC converter to convert the AC power into the first DC voltage, and the first microcontroller generates the regulation indication for use by the second microcontroller.

2. The charger as claimed in claim 1, wherein when the handshake between the first microcontroller and the DC charging station succeeds and the second microcontroller detects that the AC power is input through the third connection port, the second microcontroller disables the AC-DC converter.

3. The charger as claimed in claim 1, wherein when the handshake result between the first microcontroller and the battery shows that the handshake was a success, the first microcontroller generates the regulation indication according to a charging indication transmitted through the second connection port by the battery.

4. The charger as claimed in claim 3, wherein when the handshake result between the first microcontroller and the battery shows that the handshake has failed, the first microcontroller generates the regulation indication according to a predetermined charging indication; or the first microcontroller generates the regulation indication according to a measurement result of the battery, wherein the measurement result is obtained by measuring via the second connection port.

5. A charging method, adapted to a charger, the charging method comprising:
    using a first microcontroller of the charger to communicate with a DC charging station by handshake via a first connection port of the charger;
    using the first microcontroller of the charger to communicate with a battery by handshake via a second connection port of the charger;
    when the handshake between the first microcontroller and the DC charging station succeeds, using the first microcontroller to generate a regulation indication according to a handshake result between the first microcontroller and the battery;
    using a second microcontroller of the charger to generate a regulation signal according to the regulation indication;
    using a DC-DC converter of the charger to convert a first DC voltage into a second DC current/voltage according to the regulation signal, and output the second DC current/voltage through a second connection port of the charger so as to charge the battery, wherein the first DC voltage is supplied by the DC charging station when the handshake between the first microcontroller and the DC charging station has succeeded, and the second DC voltage is lower than the first DC voltage;

using the second microcontroller to detect whether there is an AC power input through a third connection port of the charger; and when the handshake between the first microcontroller and the DC charging station fails and the second microcontroller detects that the AC power is input through the third connection port, using the second microcontroller to enable an AC-DC converter of the charger to convert the AC power to the first DC voltage, and using the first microcontroller to generate the regulation indication for use by the second microcontroller.

6. The charging method as claimed in claim 5, further comprising:

when the handshake between the first microcontroller and the DC charging station succeeds and the second microcontroller detects that the AC power is input through the third connection port, using the second microcontroller to disable the AC-DC converter.

7. The charging method as claimed in claim 5, wherein when the handshake result between the first microcontroller and the battery shows that the handshake was a success, the step of using the first microcontroller to generate the regulation indication further comprises using the first microcontroller to generate the regulation indication according to a charging indication transmitted through the second connection port by the battery.

8. The charging method as claimed in claim 5, wherein when the handshake result between the first microcontroller and the battery shows that the handshake has failed, the step of using the first microcontroller to generate the regulation indication further comprises using the first microcontroller to generate the regulation indication: according to a predetermined charging indication; or according to a measurement result of the battery, wherein the measurement result is obtained by measuring via the second connection port.

\* \* \* \* \*